United States Patent
Kishi

(10) Patent No.: US 7,715,637 B2
(45) Date of Patent: May 11, 2010

(54) IMAGE PROCESSING APPARATUS AND CONTROL METHOD THEREFOR

(75) Inventor: Hiroki Kishi, Chiba-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 830 days.

(21) Appl. No.: 11/565,903

(22) Filed: Dec. 1, 2006

(65) Prior Publication Data

US 2007/0127826 A1  Jun. 7, 2007

(30) Foreign Application Priority Data

Dec. 7, 2005  (JP) ............................. 2005-353985
Sep. 29, 2006  (JP) ............................. 2006-269020

(51) Int. Cl.
*G06K 9/36* (2006.01)

(52) U.S. Cl. ...................... 382/232; 382/240; 382/250; 382/251

(58) Field of Classification Search ................. 382/232, 382/233, 240, 250, 251; 358/1.12, 1.13, 358/1.15, 1.16; 711/154; 341/51
See application file for complete search history.

(56) References Cited

U.S. PATENT DOCUMENTS

| | | | |
|---|---|---|---|
| 5,638,498 A * | 6/1997 | Tyler et al. ................. | 358/1.18 |
| 5,809,474 A * | 9/1998 | Park ........................... | 704/503 |
| 5,889,961 A * | 3/1999 | Dobbek ...................... | 709/247 |
| 5,991,515 A * | 11/1999 | Fall et al. ................... | 358/1.15 |
| 6,847,735 B2 | 1/2005 | Kajiwara et al. ........... | 382/233 |
| 6,879,726 B2 | 4/2005 | Sato et al. .................. | 382/240 |
| 6,879,727 B2 | 4/2005 | Sato et al. .................. | 382/239 |
| 6,917,716 B2 | 7/2005 | Kajiwara et al. ........... | 382/240 |
| 6,947,600 B1 | 9/2005 | Sato et al. .................. | 382/233 |
| 6,950,471 B2 | 9/2005 | Kishi ..................... | 375/240.19 |
| 6,993,198 B2 | 1/2006 | Kishi ......................... | 382/240 |
| 2005/0100226 A1 | 5/2005 | Kajiwara et al. ........... | 382/173 |
| 2005/0276500 A1 | 12/2005 | Nakayama et al. ......... | 382/232 |
| 2005/0276501 A1 | 12/2005 | Nakayama et al. ......... | 382/233 |
| 2007/0160299 A1 | 7/2007 | Kajiwara et al. ........... | 382/232 |
| 2007/0286478 A1 | 12/2007 | Kishi ......................... | 382/181 |
| 2008/0089413 A1 | 4/2008 | Kishi et al. ............. | 375/240.13 |

FOREIGN PATENT DOCUMENTS

JP  07-066965  10/1995

* cited by examiner

*Primary Examiner*—Anh Hong Do
(74) *Attorney, Agent, or Firm*—Fitzpatrick, Cella, Harper & Scinto

(57) ABSTRACT

This invention switches the number of bits per pixel between object types when converting code information into image data, thereby rendering one entire page at high speed while minimizing the influence on print quality. For this purpose, an apparatus analyzes received PDL data, and generates a DL (Display List) serving as a rendering unit. The apparatus determines whether the DL is a character/line image or a halftone image including a photograph image. When determining that the DL is a character/line image, the apparatus resizes the DL in accordance with the resolution of a printer engine, and renders each color component at an 8-bit precision (integer). When determining that the DL is a halftone image including a photograph image, the apparatus resizes the DL in accordance with the resolution of the printer engine, and renders each color component at a 10-bit precision (8-bit integral part+2-bit decimal part).

14 Claims, 19 Drawing Sheets

FIG. 15

JPEG-LS (LOSSLESS ENCODING)

| NUMBER OF BITS IN RENDERING | PHOTOGRAPH ATTRIBUTE | GRADATION ATTRIBUTE | CHARACTER / LINE IMAGE ATTRIBUTE |
|---|---|---|---|
| | 8 | 10 | 8 |

FIG. 17

JPEG (LOSSY ENCODING)

| NUMBER OF BITS IN RENDERING | PHOTOGRAPH ATTRIBUTE | GRADATION ATTRIBUTE | CHARACTER / LINE IMAGE ATTRIBUTE |
|---|---|---|---|
| | 10 | 10 | 8 |

IMAGE PROCESSING APPARATUS AND CONTROL METHOD THEREFOR

BACKGROUND OF THE INVENTION

1. Field of the Invention

The present invention relates to an image processing apparatus which receives code information such as PDL data and encodes image data generated based on the code information, and a control method therefor.

2. Description of the Related Art

A general page printer requires a page memory for accumulating a one-page image. For example, a printer capable of printing an A3 full-color image (24 bits per pixel) at a resolution of 400 dpi requires a memory as large as 96 Mbytes, which accounts for a large part of the cost.

One solution to this problem is an image compression algorithm such as a JPEG encoding technique (e.g., Japanese Patent Laid-Open No. 07-066965). This algorithm compresses image data by DCT transformation and quantization, and decompresses the data in real time when printing it out. This can reduce the amount of uncompressed image data to about 1/10 or less, greatly decreasing the memory cost.

To improve the image quality, data must be processed not at a bit precision of 8 bits per pixel but at a higher bit precision of 10 bits per pixel, as shown in FIG. 6.

Compressing image data expressed by 10 bits per pixel, unlike conventional image data, may influence the compression/decompression speed, rendering speed, or data transfer speed because the original data amount is larger than the conventional one.

SUMMARY OF THE INVENTION

The present invention has been made to overcome the conventional drawbacks, and has as its object to provide a technique for switching the number of bits per pixel between object types when converting code information into image data, thereby increasing the speed of conversion into a one-page image while minimizing the influence on the quality of an output image.

To solve the above problems, for example, an image processing method according to the present invention comprises the following steps.

That is, an image processing method comprising:
- a selection step of selecting one of a plurality of compression algorithms;
- an input step of inputting a code representing an object;
- a discrimination step of discriminating the type of object represented by the code;
- a decision step of deciding, in accordance with the object type and the selected compression algorithm, the number of bits per pixel of image data to be converted from the code;
- a conversion step of converting the code into image data of the decided number of bits; and
- an encoding step of encoding the converted image data based on the selected compression algorithm.

The present invention can, therefore, switch the rendering precision depending on the type of object to be rendered, thereby rendering one entire page at high speed while minimizing the influence on the print quality.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 15 is a table showing the correspondence between each image attribute and the rendering precision in the use of JPEG-LS;

FIG. 17 is a table showing the correspondence between each image attribute and the rendering precision in the use of JPEG;

DESCRIPTION OF THE EMBODIMENTS

Preferred embodiments of the present invention will be described in detail below with reference to the accompanying drawings.

First Embodiment

The first embodiment will examine a system including a lossless compression unit (compression unit which performs lossless compression, i.e., quality non-degrading compression), and an over 8-bit rendering unit (processing unit which renders an image by n bits per pixel, which is larger in number than 8 bits per pixel). As for image data expressed by n=10, i.e., 10 bits per pixel, it may be rendered by resizing the image data into an 8-bit integral part and 2-bit decimal part.

Ten-bit rendering takes a longer process time than that of 8-bit rendering. A 10-bit rendered image also requires a longer process time even in compression, decompression, and transmission than that of an 8-bit rendered image, and increases the compressed file size.

In resizing, the interpolation pixel of a photograph or gradation image can take a value below the decimal point. To improve tonality, the photograph or gradation image desirably has a pixel value not of 8 bits but of 10 bits for high quality.

SVG or the like is sometimes used as a language (page description language: PDL) for describing a print instruction transmitted from a PC (Personal Computer). SVG can represent a pixel value by the percentage of the dynamic range. The percentage representation is desirable for efficiently creating PDL data of an image whose pixels hardly vary, such as a character/line image or gradation image. As for the character/line image, one cannot visually sense variations of the pixel value by several levels. Thus, 10-bit rendering is unnecessary for a percentage-represented character/line image, and 8-bit rendering is sufficient. The first embodiment, therefore, renders a character/line image at a precision of 8 bits and a halftone image (e.g., a natural picture) other than the character/line image at a precision of 10 bits.

Figure 1:
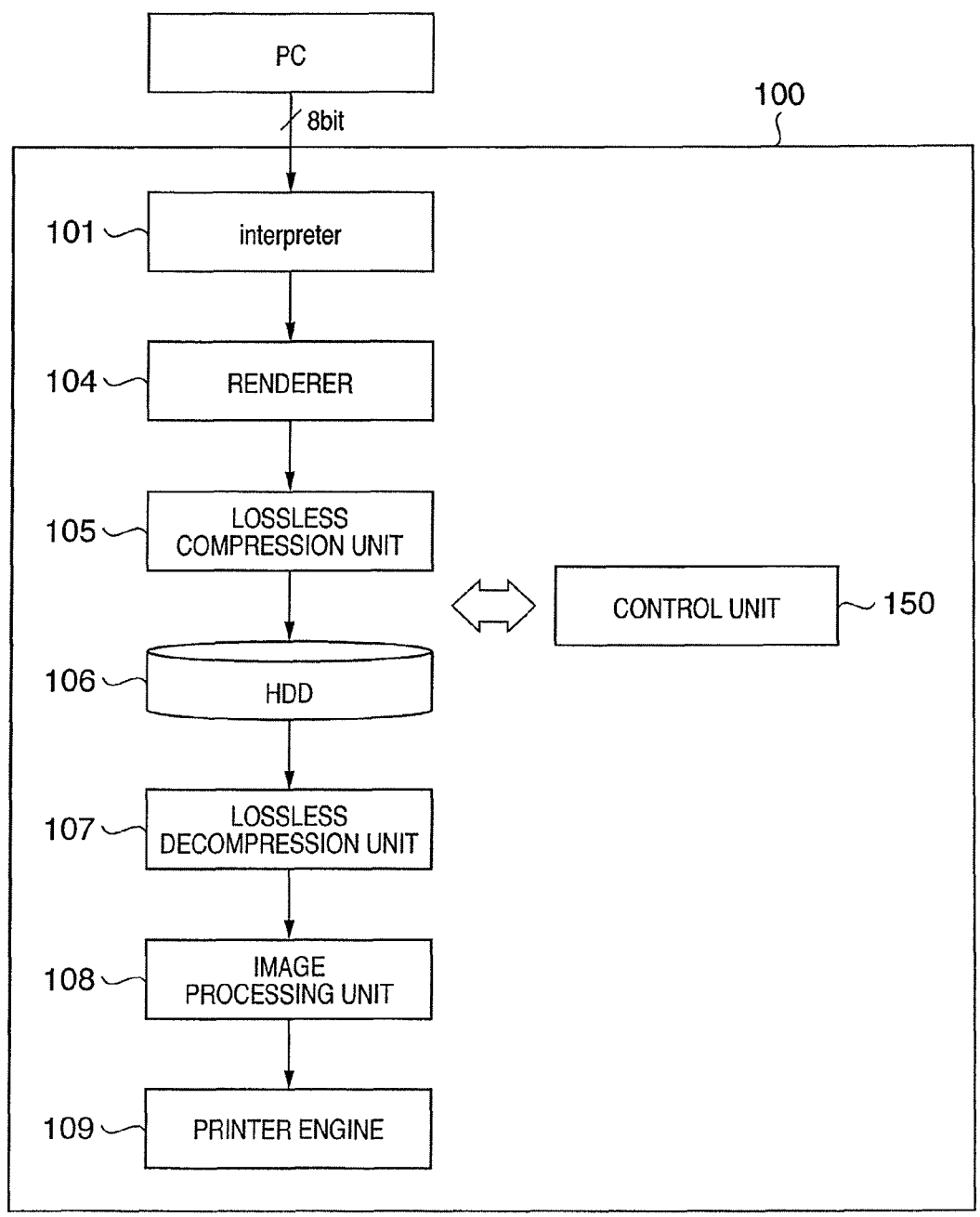
FIG. 1 is a block diagram of an image processing apparatus in the first embodiment.

FIG. 1 is a block diagram showing the main part of an image processing apparatus (a copying machine, or a so-called multifunctional peripheral having a scanner, printer, and communication function) in the first embodiment. In FIG. 1, reference numeral 101 denotes an interpreter; 104, a renderer; 105, a lossless compression unit; 106, an HDD; 107, a lossless decompression unit; 108, an image processing unit; and 109, a printer engine. Reference numeral 150 denotes a control unit which controls the overall apparatus and comprises a CPU, ROM, and RAM.

A user of this image processing apparatus operates a PC application to instruct it to transmit a document to be printed out to the image processing apparatus. The document contains, for example, an image (8 bits for each of R, G, and B components) obtained by a digital camera or the like, and a drawing command for a character/line image (including color information). A printer driver running on the PC converts target print data into PDL data, and transmits the PDL data to the image processing apparatus.

The interpreter 101 receives the PDL data transmitted to the image processing apparatus. The interpreter 101 converts the input PDL data into a language (display list: DL) interpretable by the image processing apparatus for each object, and outputs the DL data to the renderer 104.

The renderer 104 bitmaps the DL data in a video memory (not shown). In bitmapping, the renderer 104 executes resizing (enlargement process) because an input image and print-out image are different in resolution. Although resizing generates a value below the decimal point, each of the R, G, and B components of a photograph or gradation image is rendered at the 10-bit precision in order to hold tonality. A character/line image is resized and rendered by replacing each of the R, G, and B components with a pixel value at the 8-bit precision of the percentage representation.

The character/line image is considered to be formed from an edge and a solid area (area where the density is constant). In the solid area, no resizing generates a value below the decimal point. At the edge, resizing generates a value below the decimal point, which is removed because the value below the decimal point degrades the halftone image quality. As a result, even resizing a character/line image does not generate any value below the decimal point.

This rendering changes the bit precision between pages, so each page must have bit precision information. As the bit precision information, a predetermined bit string ("01" in the first embodiment) is added after the LSB of an 8-bit pixel to produce an apparent 10-bit pixel. The renderer 104 transmits the rendered bitmap data to the lossless compression unit 105.

The lossless compression unit 105 counts the number of 8-bit pixels whose lower 2 bits are "01". When rendering a photograph or gradation image, the rendered data may contain pixels whose lower 2 bits are "01". In a character/line image, pixels whose lower 2 bits are "01" are successively distributed. To the contrary, in a photograph or gradation image, pixels whose lower 2 bits are "01" are less likely to be adjacent to each other. From this, when pixels whose lower 2 bits are "01" are successive by a number indicated by a threshold T0 or more, it is determined that these pixels belong to a character/line image, and the number of pixels are counted. The threshold T0 is determined depending on the print resolution of the printer engine, in other words, the resizing ratio.

In this manner, the lossless compression unit 105 counts the number N of pixels of a one-page character/line image. If the number N is equal to or larger than a preset threshold T1, the lossless compression unit 105 determines that this page is a character/line image page. If the number N is smaller than the threshold T1, the lossless compression unit 105 determines that this page is a halftone image page such as a natural picture.

If the lossless compression unit 105 determines that the target page is a character/line image page, it rounds lower 2 bits of a rendered 10-bit pixel into an 8-bit pixel, losslessly compresses one entire page as an 8-bit image, and stores the losslessly compressed image in the HDD 106.

If the lossless compression unit 105 determines that the target page is a halftone image page, it losslessly compresses a 10-bit image and stores the losslessly compressed image in the HDD 106. The first embodiment employs JPEG-LS as the lossless compression algorithm.

The lossless decompression unit 107 reads out compressed data from the HDD 106 in synchronism with the print timing of the printer engine 109, decompresses the readout data by JPEG-LS, and outputs a bitmap image and type information to the image processing unit 108. The image processing unit 108 generates printing color components Y, M, or C, or color components Y, M, C+black K by UCR from the decompressed image data (each component has 10 or 8 bits). The image processing unit 108 outputs the generated printing color components to the printer engine 109.

Figure 13:
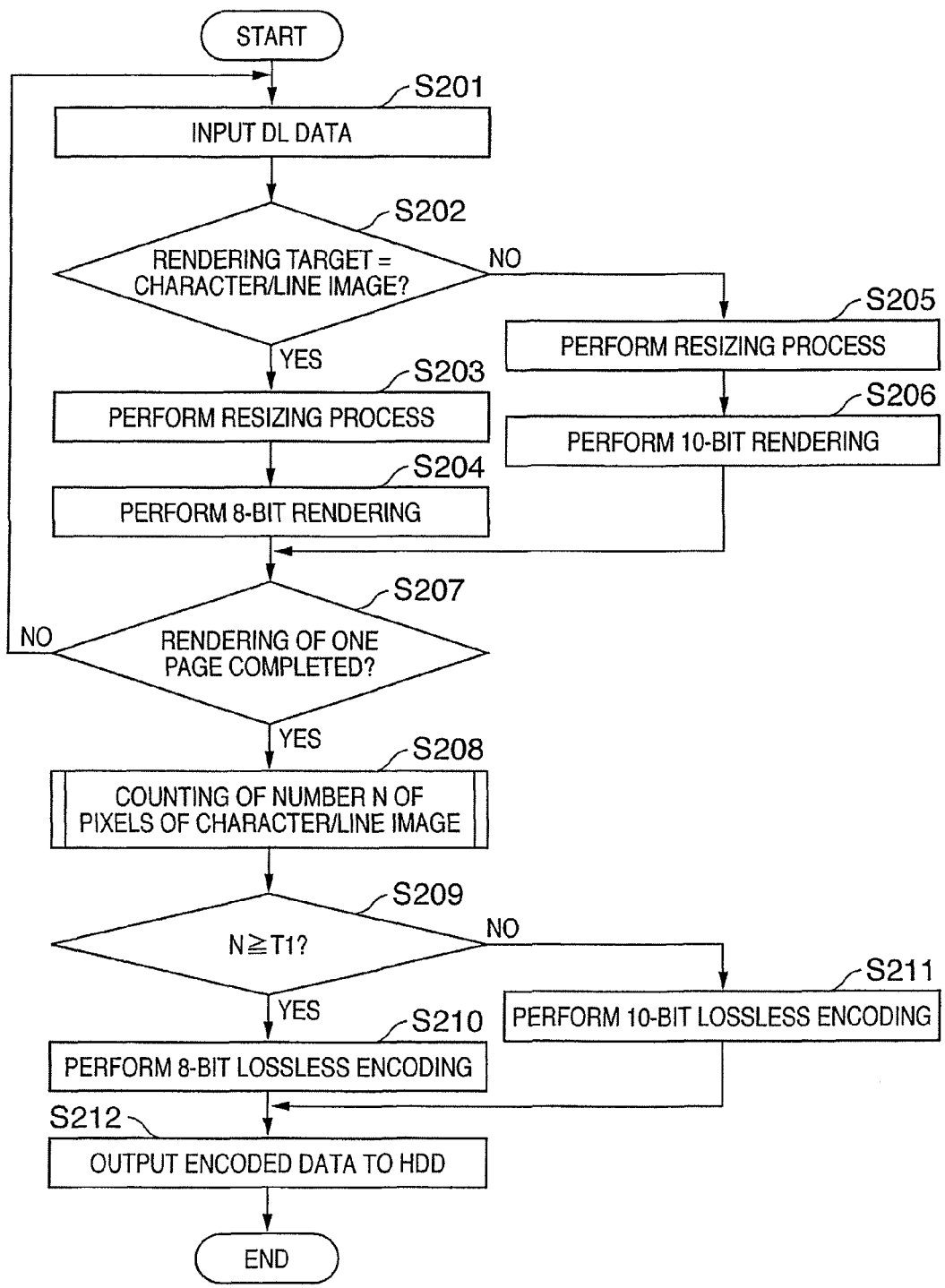
FIG. 13 is a flowchart showing process procedures in the first embodiment.

The above-described rendering procedures, which are a feature of the first embodiment, and storage in the HDD 106 are summarized into the flowchart in FIG. 13. The process procedures of the control unit 150 will be explained with reference to FIG. 13. The ROM in the control unit 150 stores a program serving as the process procedures shown in FIG. 13.

In step S201, the control unit 150 reads DL data converted by the interpreter 101. In step S202, the control unit 150 determines based on the DL data whether the rendering target is a character/line image or a halftone image such as a natural picture.

If the control unit 150 determines that the rendering target is a character/line image, the process advances to step S203 to resize the drawing command of the character/line image in accordance with the resolution of the printer engine 109. In step S204, the control unit 150 renders 8-bit color components in a bitmap memory (not shown). At this time, the control unit 150 adds "01" after the LSB.

If the control unit 150 determines that the rendering target is a halftone image such as a natural picture, the process advances to step S205 to resize bitmap data of the natural picture in accordance with the resolution of the printer engine

109. This resizing process is, e.g., linear interpolation. To improve reproducibility, the control unit 150 performs interpolation calculation at a precision having 2 bits below the decimal point. The process advances to step S206 to render obtained 10-bit data (one pixel is made up of R, G, and B and thus has 30 bits).

In step S207, the control unit 150 determines whether rendering of one page is complete.

If the result is NO in step S207, the control unit 150 repeats the processes in step S201 and subsequent steps.

Upon completion of rendering one page, the process advances to step S208 to count the number of rendered pixels of the character/line image. As described above, pixel data of a character/line image each have "01" as the lower 2 bits and do not exist isolately. For this reason, when pixels whose lower 2 bits are "01" are successive by a predetermined number (T0 in the first embodiment) or more in the vertical, horizontal, and oblique directions, the control unit 150 determines that the target image is a character/line image, counts the number of pixels, and adds the counts over one page. In other words, when the number of successive pixels whose lower 2 bits are "01" is smaller than T0, the control unit 150 does not count these pixels.

After counting the total number N of pixels of the character/line image contained in one page, the process advances to step S209 to determine whether the number N of pixels is equal to or larger than the threshold T1 (N≧T1).

If the control unit 150 determines that N≧T1, the process advances to step S210 to round the decimal part of each pixel of bitmap data rendered in the memory and losslessly encode upper 8 bits.

If the control unit 150 determines that N<T1, the process advances to step S211 to losslessly encode 12-bit bitmap data rendered at a precision of 12 bits.

In either case, the process advances to step S212 to store the losslessly encoded data in the HDD 106. When storing the losslessly encoded file in the HDD 106, the file header stores information representing which of the 8- and 10-bit lossless compression processes has been performed.

By changing the rendering precision in accordance with the image attribute, a character/line image can be rendered at high speed by an 8-bit integer operation capable of almost ignoring the influence on the image quality. A halftone image can undergo rendering which gives priority to reproducibility by containing a value up to the second decimal place. As a result, the rendering process speed becomes higher than that of rendering at a constant 10-bit precision. Further, the first embodiment can suppress power consumption.

In the above example, when the number of successive pixels whose 2 bits below the decimal point are "01" is equal to or larger than the threshold T0, it is determined that these pixels belong to a character/line image. To further increase the precision, an attribute memory of one pixel=one bit is also available. In this case, the attribute memory is initialized to "0" before the start of rendering, and "1" is written as the value of the attribute memory when rendering a character/line image. It is sufficient to count only the number of "1" pixels in the attribute memory, further increasing the process speed.

Second Embodiment

Figure 2:
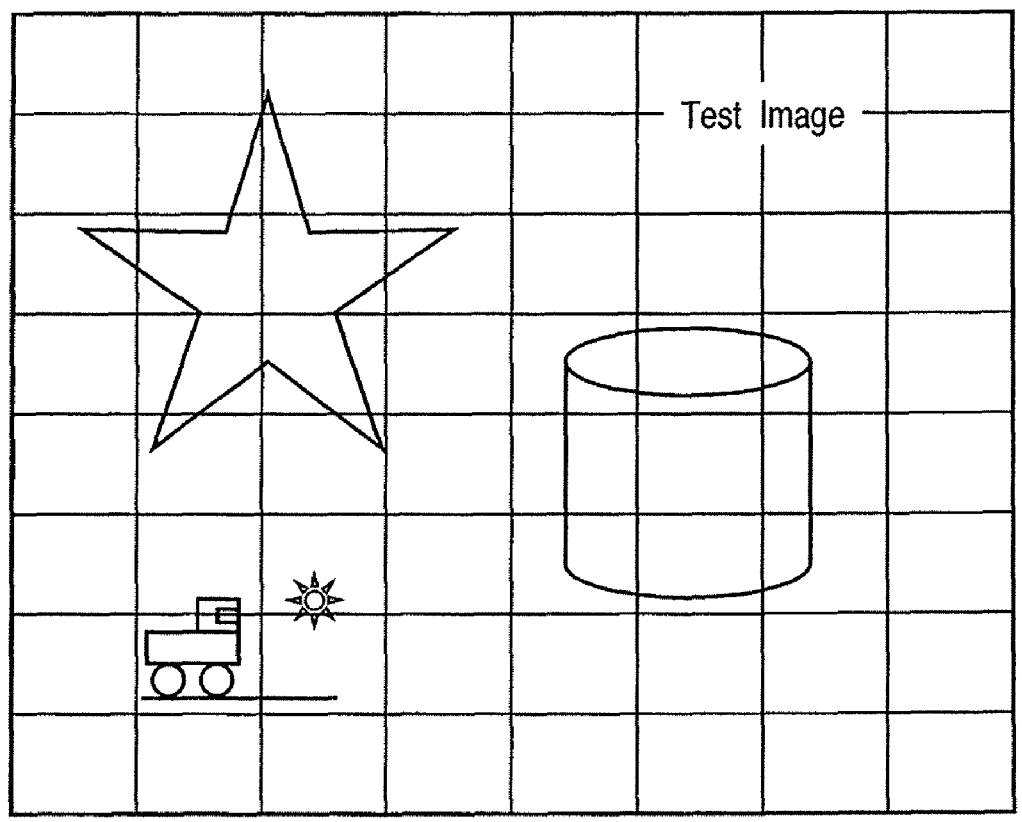
FIG. 2 is a view showing an example of dividing image data into tiles in the embodiment.

In the first embodiment, the process unit is an entire page. However, in terms of the memory cost, it is also possible to divide a page into a plurality of rectangles (tiles), as shown in FIG. 2, and process each tile, instead of using the entire page as the process unit. The second embodiment will describe an example using each tile as the process unit. Unspecified parts are the same as those in the first embodiment.

Figure 3:
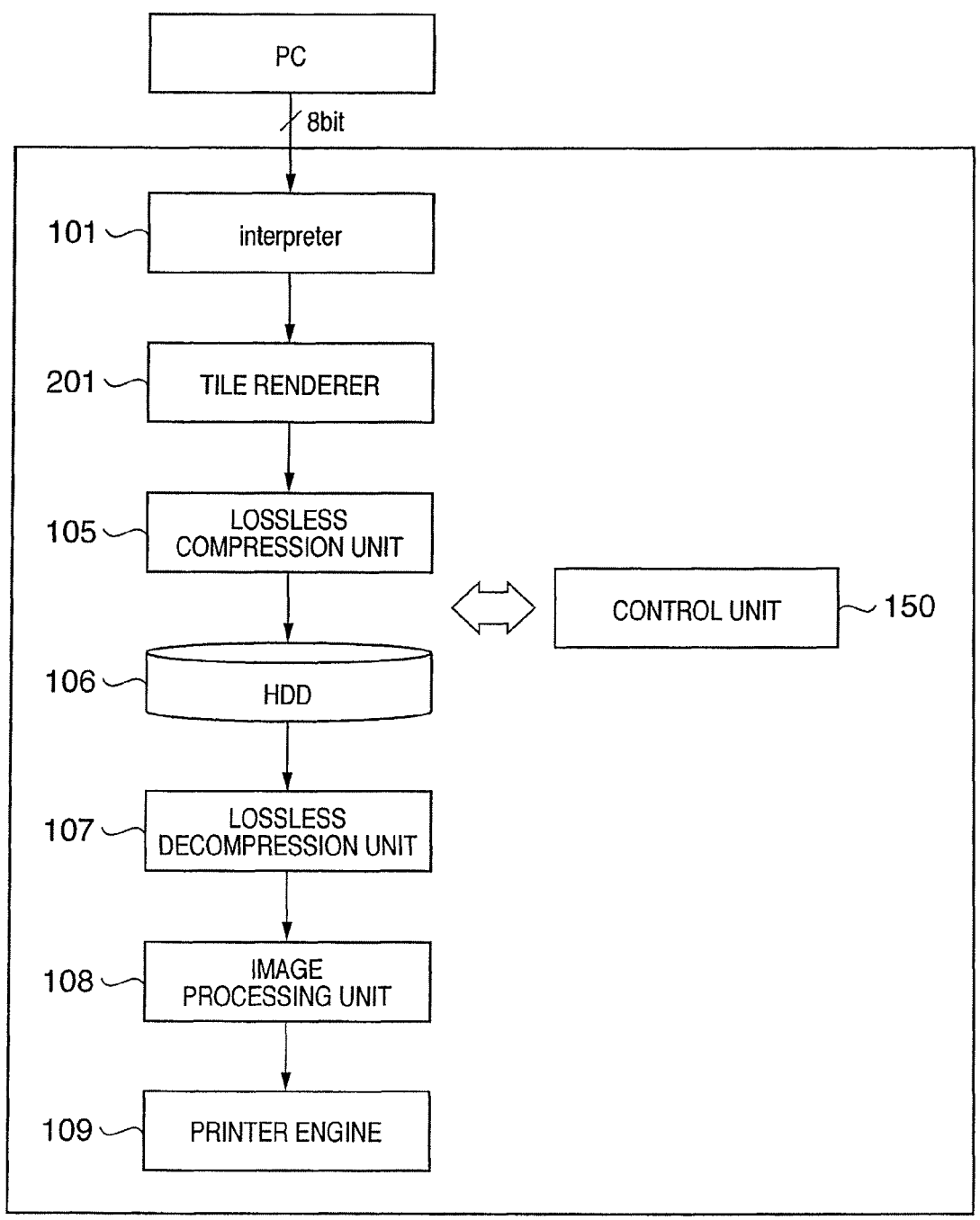
FIG. 3 is a block diagram of an image processing apparatus in the second embodiment.

FIG. 3 is a block diagram of an image processing apparatus (copying machine, multifunctional peripheral, or the like) in the second embodiment. In FIG. 3, a tile renderer 201 replaces the renderer 104 in the block diagram of FIG. 1.

A page input to an interpreter 101 is converted into DL data, which is transmitted to the tile renderer 201. Similar to the first embodiment, the tile renderer 201 resizes and renders the DL data, and transmits bitmap data of a tile to a lossless compression unit 105. The second embodiment determines whether each tile is a character/line image or a halftone image. That is, the second embodiment performs 8- or 10-bit lossless compression for each tile. The header of each tile of a compressed file stored in an HDD 106 stores information representing which of the 8- and 10-bit lossless compression processes has been performed.

In the process to determine which of the 8- and 10-bit lossless compression processes has been performed, only the target changes from a page to a tile. Hence, step S207 in the flowchart of FIG. 13 is changed to "rendering of one tile completed?", and the process in FIG. 13 is repeated by the number of tiles forming one page.

In the second embodiment, even each tile can be processed similarly to the first embodiment. Even rendering does not require a one-page memory.

Third Embodiment

In general, a character/line image and a gradation image such as computer graphics seriously degrade in quality upon lossy compression (quality degrading compression) such as JPEG, but a photograph image hardly degrades. In the third embodiment, the image compression unit comprises a lossless compression unit (compression processing unit which performs lossless compression or quality non-degrading compression) and a lossy compression unit (compression processing unit which performs lossy compression or quality degrading compression). The third embodiment will explain an example of processing a photograph image by the lossy compression unit and a character/line image and gradation image by the lossless compression unit.

Figure 4:
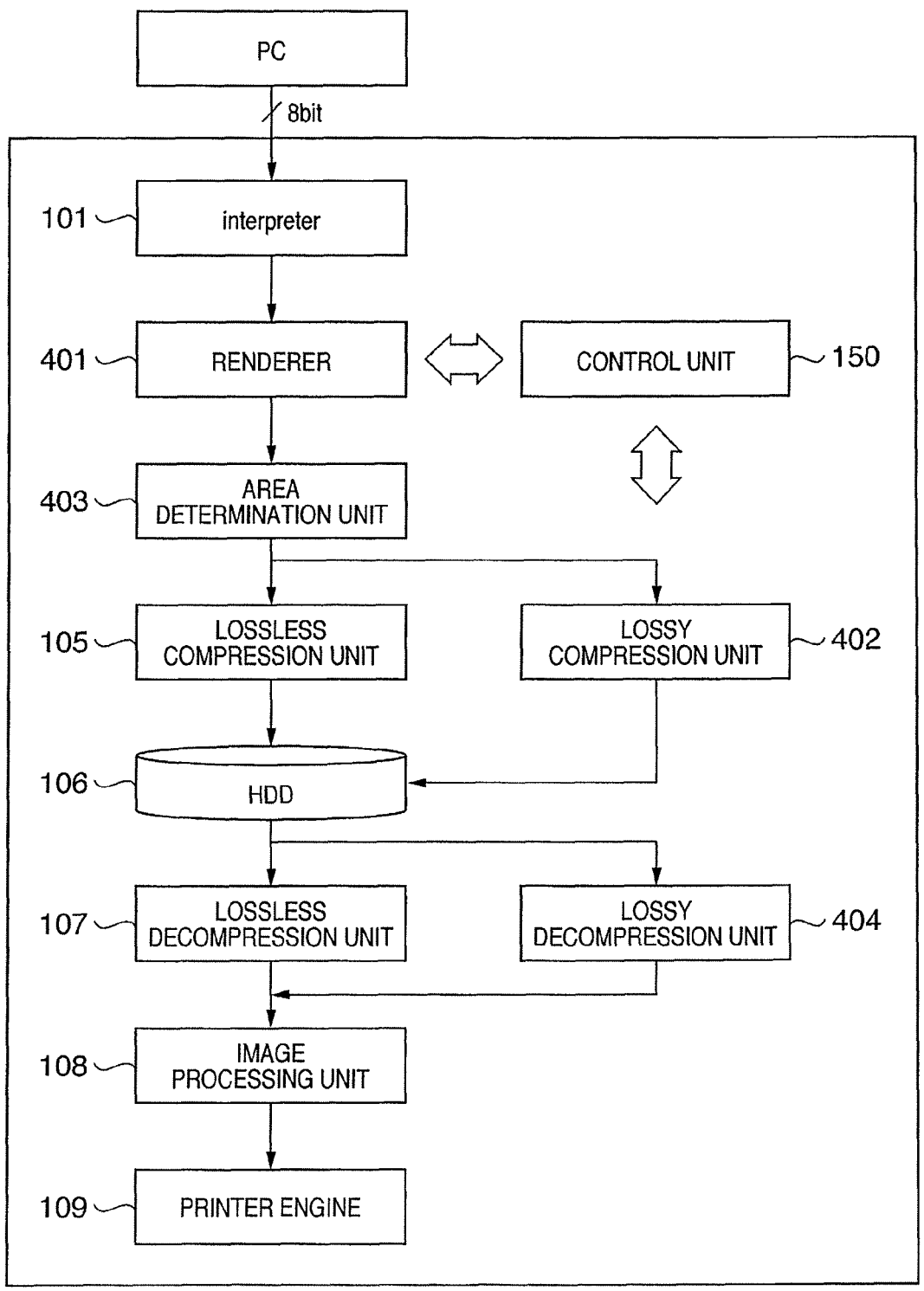
FIG. 4 is a block diagram of an image processing apparatus in the third embodiment.

FIG. 4 is a block diagram of an image processing apparatus (copying machine, multifunctional peripheral, or the like) in the third embodiment. In FIG. 4, a renderer 401 replaces the renderer 104 in the block diagram of FIG. 1, and a lossy compression unit 402, area determination unit 403, and lossy decompression unit 404 are added.

Figure 7:
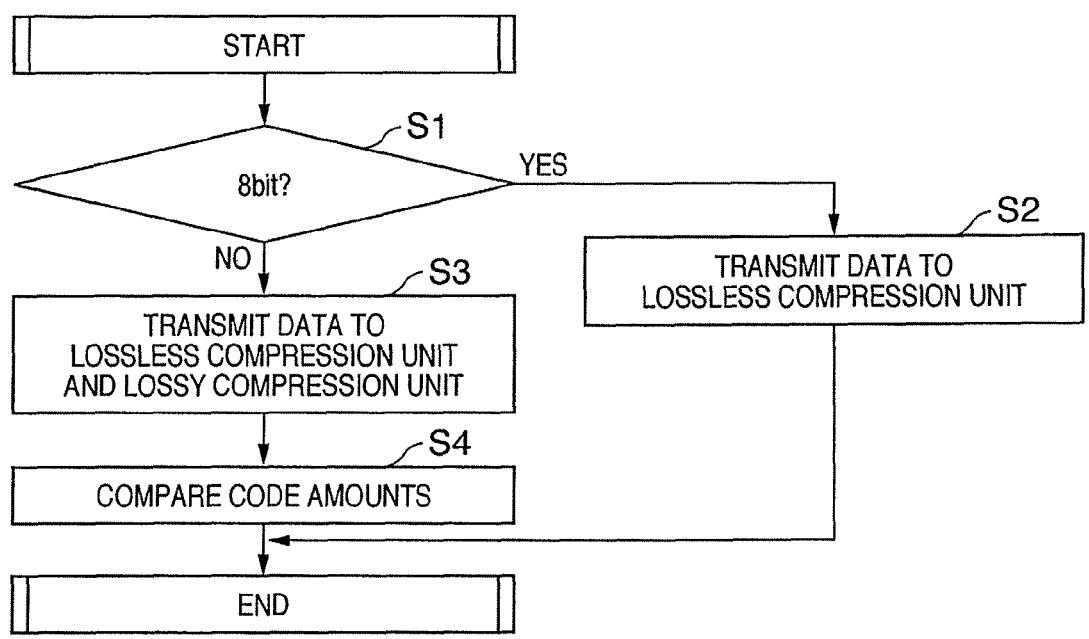
FIG. 7 is a flowchart showing area determination process procedures in the third embodiment.

PDL data input to an interpreter 101 is converted into DL data, which is transmitted to the renderer 401. Similar to the first embodiment, the renderer 401 resizes and renders the DL data. It is determined during rendering whether the data is a halftone image (e.g., a photograph image) or a character/line image, so the renderer 401 transmits image area information to the area determination unit 403. The area determination unit 403 determines the area in accordance with the sequence shown in FIG. 7.

The area determination unit 403 checks side information, and if the bit precision of the page is 8 bits (step S1), it determines that the area is a character/line image area. Since lossless compression is more efficient than lossy compression for the character/line image area, the area determination unit 403 transmits the bitmap data to a lossless compression unit 105 (step S2). The lossless compression unit 105 JPEG-LS-compresses the received bitmap data, and transmits the compressed data to an HDD 106. If the bit precision of the page is 10 bits (step S1), the area is a gradation or photograph image area, and the area determination unit 403 transmits a copy of bitmap data to the lossless compression unit 105 and lossy compression unit 402 (step S3). The lossless compression unit 105 and lossy compression unit 402 compress the bitmap data, and send back the compressed data to the area determination unit 403. The lossy compression unit 402 executes JPEG encoding. The area determination unit 403 compares the code amounts of the two compressed data (step S4). If the code amount of the losslessly compressed data is smaller, the area is a gradation image area, and the area determination unit 403 transmits the lossless data to the HDD 106. If the code amount of the lossy compressed data is smaller, the area is a photograph image area, and the area determination unit 403 transmits the lossy data to the HDD 106.

The subsequent process is almost the same as that in the first embodiment, and a description thereof will be omitted.

The third embodiment has described the rendering method in the image processing apparatus which comprises lossless compression and lossy compression as compression units.

Fourth Embodiment

In the third embodiment, the process unit is an entire page. However, in terms of the memory cost, the process unit may be a tile prepared by dividing a page into a plurality of rectangles (tiles), as shown in FIG. 2, instead of an entire page. The fourth embodiment will describe an example using a tile as the process unit.

Figure 5:
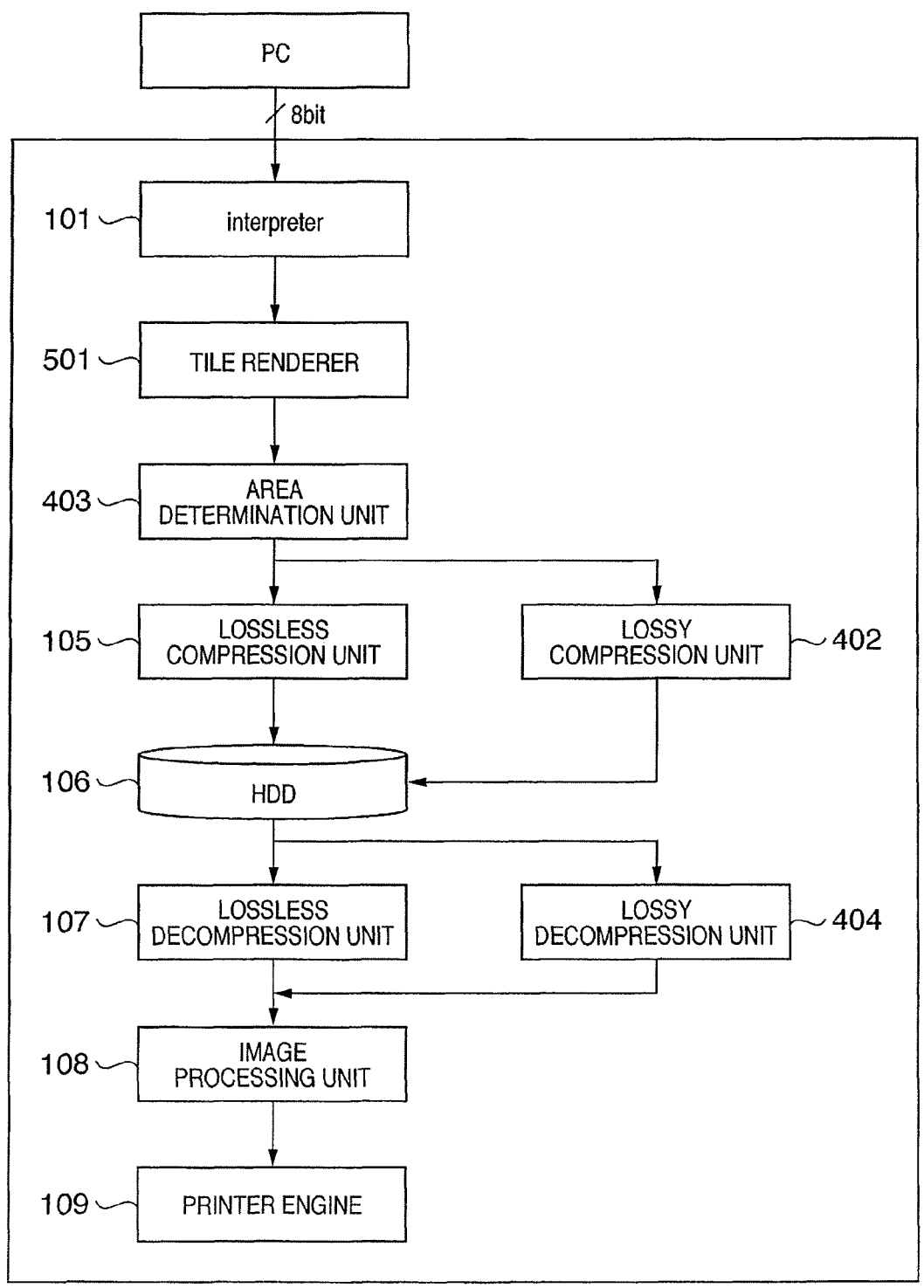
FIG. 5 is a block diagram of an image processing apparatus in the fourth embodiment.
Figure 6:
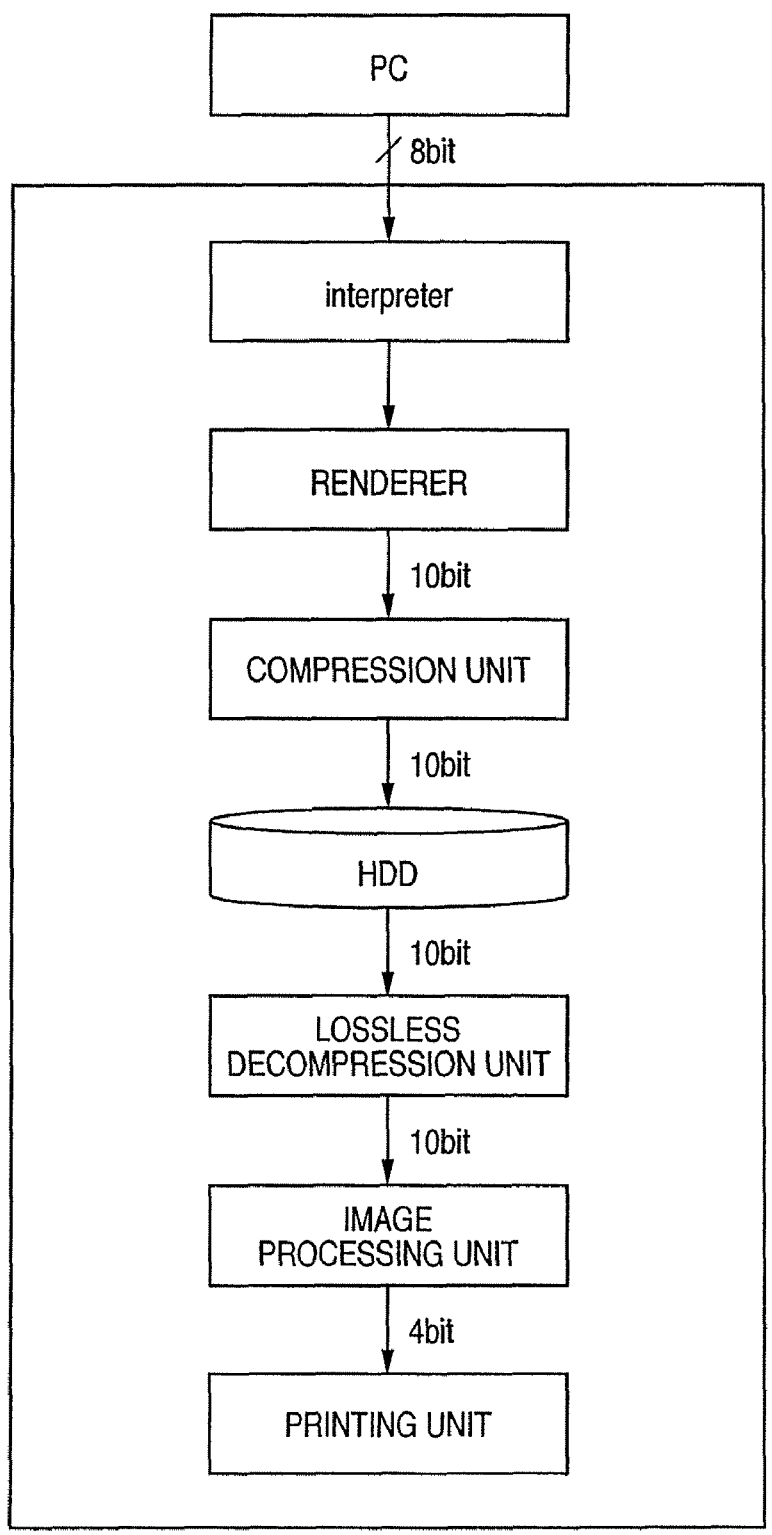
FIG. 6 is a block diagram of an image processing apparatus of a 10-bit processing system.

FIG. 5 is a block diagram of an image processing apparatus (copying machine, multifunctional peripheral, or the like) in the fourth embodiment. In FIG. 5, a tile renderer 501 replaces the renderer 401 in the block diagram of FIG. 4.

A page input to an interpreter 101 is converted into DL data, which is transmitted to the tile renderer 501. Similar to the third embodiment, the tile renderer 501 renders the DL data, and transmits the data to an area determination unit 403. The subsequent process is almost the same as that in the third embodiment, and a description thereof will be omitted.

The fourth embodiment has described the rendering method in the image processing apparatus which processes each tile, and comprises lossless compression and lossy compression as compression units.

Fifth Embodiment

The PDL sometimes represents the pixel value of a character/line image or gradation image not by the percentage but by a numerical value (0 to 255 in the fifth embodiment). The fifth embodiment will explain a rendering method in this case.

Figure 8:
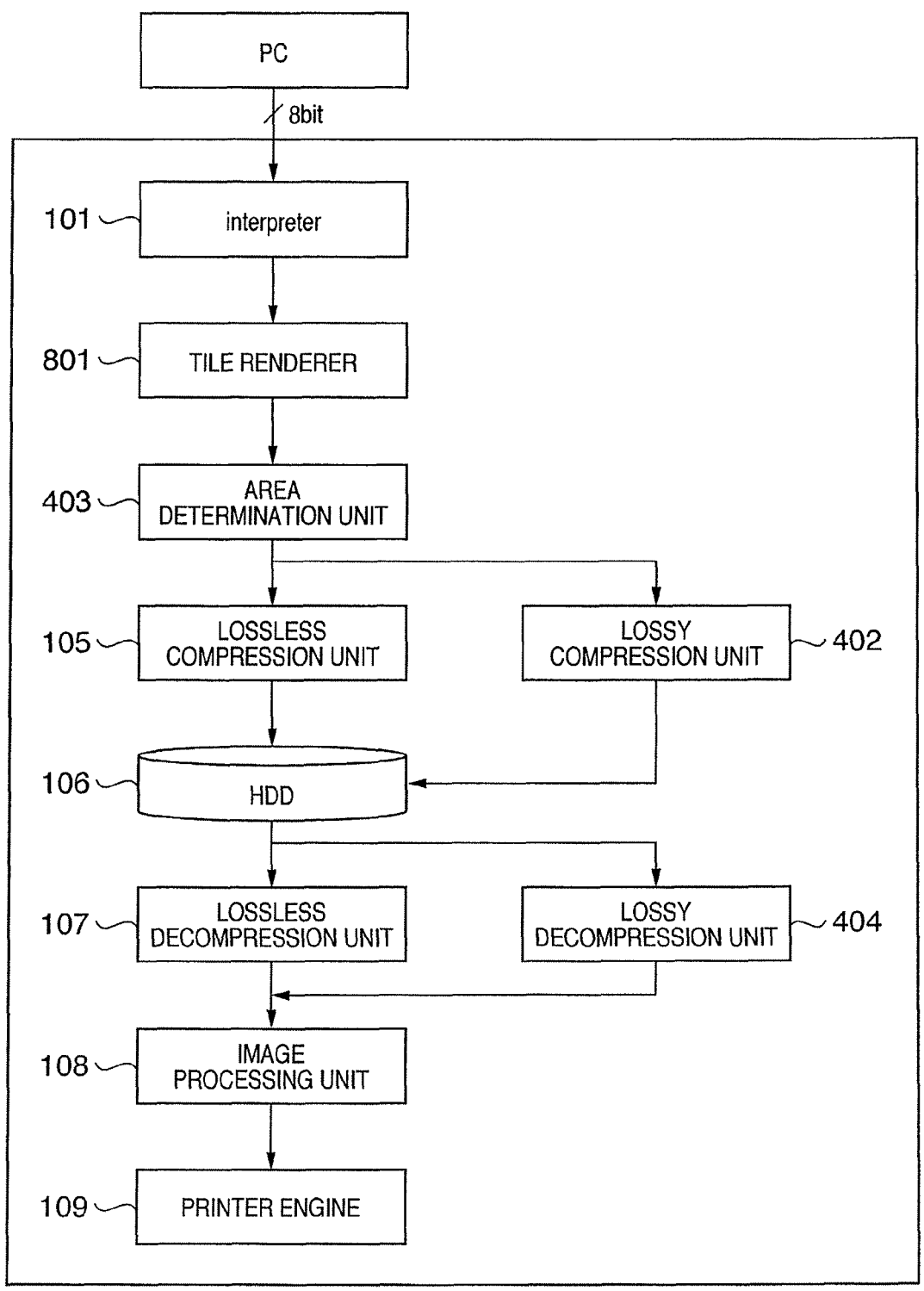
FIG. 8 is a block diagram of an image processing apparatus in the fifth embodiment.

FIG. 8 is a block diagram of an image processing apparatus (copying machine, multifunctional peripheral, or the like) in the fifth embodiment. In FIG. 8, a tile renderer 801 replaces the tile renderer 501 in the block diagram of FIG. 5.

A page input to an interpreter 101 is converted into DL data, which is transmitted to the tile renderer 801. The tile renderer 801 renders the DL data. In the fifth embodiment, not only a photograph image but also a character/line image and gradation image in PDL data are represented by numerical values (0 to 255). As for a character/line image, resizing does not generate any 10-bit values. Thus, a character/line image area is rendered at 8 bits in a predetermined memory, and a bit string ("01" in the fifth embodiment) representing the 8-bit area is inserted at the LSB.

An area determination unit 403 receives the rendering result of each tile, and counts the lower 2 bits of pixels of a character/line image, similar to the first embodiment. The area determination unit 403 compares the count value with a threshold value to determine whether the target tile is a character/line image or photograph image. Then, the area determination unit 403 outputs the data to either a lossless compression unit 105 or lossy compression unit 402.

The subsequent process is almost the same as that in the third embodiment, and a description thereof will be omitted. The fifth embodiment has described the rendering method when inputting PDL data representing the pixel value of a character/line image or gradation image by a numerical value.

Sixth Embodiment

The sixth embodiment will explain a method of determining the type of image for each pixel and switching the rendering precision.

Figure 9:
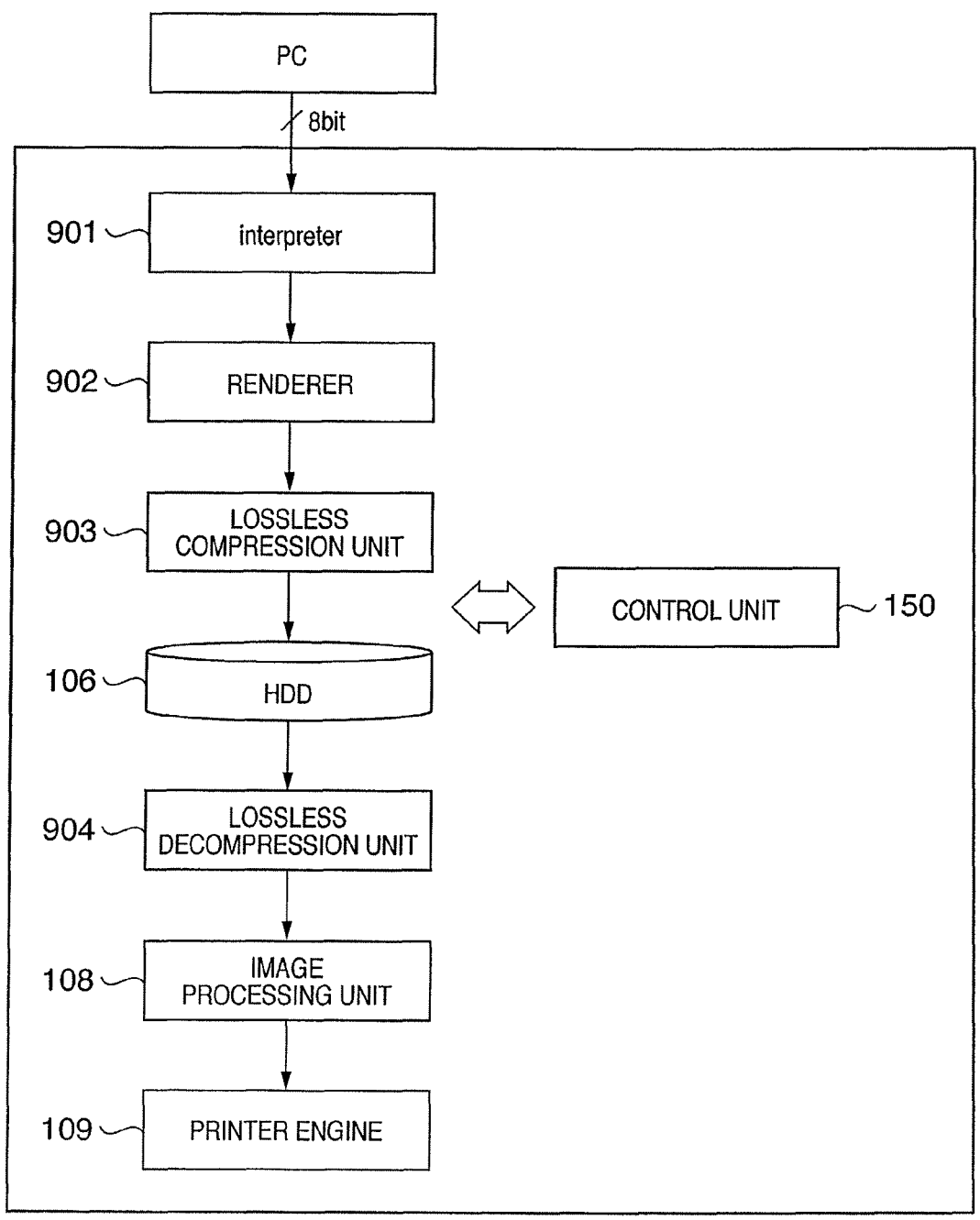
FIG. 9 is a block diagram of an image processing apparatus in the sixth embodiment.

FIG. 9 is a block diagram of an image processing apparatus in the sixth embodiment. In FIG. 9, an interpreter 901 replaces the interpreter 101 in the block diagram of FIG. 1, a renderer 902 replaces the renderer 104, a lossless compression unit 903 replaces the lossless compression unit 105, and a lossless decompression unit 904 replaces the lossless decompression unit 107.

PDL data input to the interpreter 901 contains not only pixel data of a page but also information on the type (character/line image, photograph image, or gradation image) of each pixel. The interpreter 901 converts the PDL data into DL data and transmits the DL data to the renderer 902. At this time, the interpreter 901 transmits not only the page but also the type information. Similar to the first embodiment, the renderer 902 resizes and renders the DL data, and transmits bitmap data of the tile to the lossless compression unit 903. Determination of the tile type is based on the type information transmitted from the interpreter 901. The head of the rendered bitmap data describes type information of respective pixels at once by a 1-byte information amount per pixel, and the type information is transmitted to the lossless compression unit 903. The lossless compression unit 903 losslessly compresses the bitmap data, similarly to the first embodiment, and also losslessly compresses the type information by run-length encoding or the like.

In the sixth embodiment, even each tile can be processed similarly to the first embodiment.

Seventh Embodiment

The sixth embodiment applies the same unit to determination of the image type and switching of the rendering precision. However, the present invention is not limited to this, and the image type may be determined in a unit smaller than the switching unit of the rendering precision. By referring to a result based on the smaller unit, the rendering precision may switch in a larger unit.

For example, the precision may be determined by majority determination using a plurality of determination results corresponding to a unit for switching the rendering precision. Alternatively, majority determination may also use several determination results corresponding to a unit for switching the rendering precision. Alternatively, when a result which specifies a predetermined type (e.g., a character/line image) exists among several determination results corresponding to a unit for switching the rendering precision, the rendering precision may switch to one corresponding to the predetermined type. These applications depend on a concrete purpose.

An example of performing determination of the image type and switching of the rendering precision in different units will be explained.

From the viewpoint of processing an image as quickly as possible, the seventh embodiment gives priority to an 8-bit process. The image type is determined for each tile, and the rendering precision is switched for each page larger than each tile.

Figure 10:
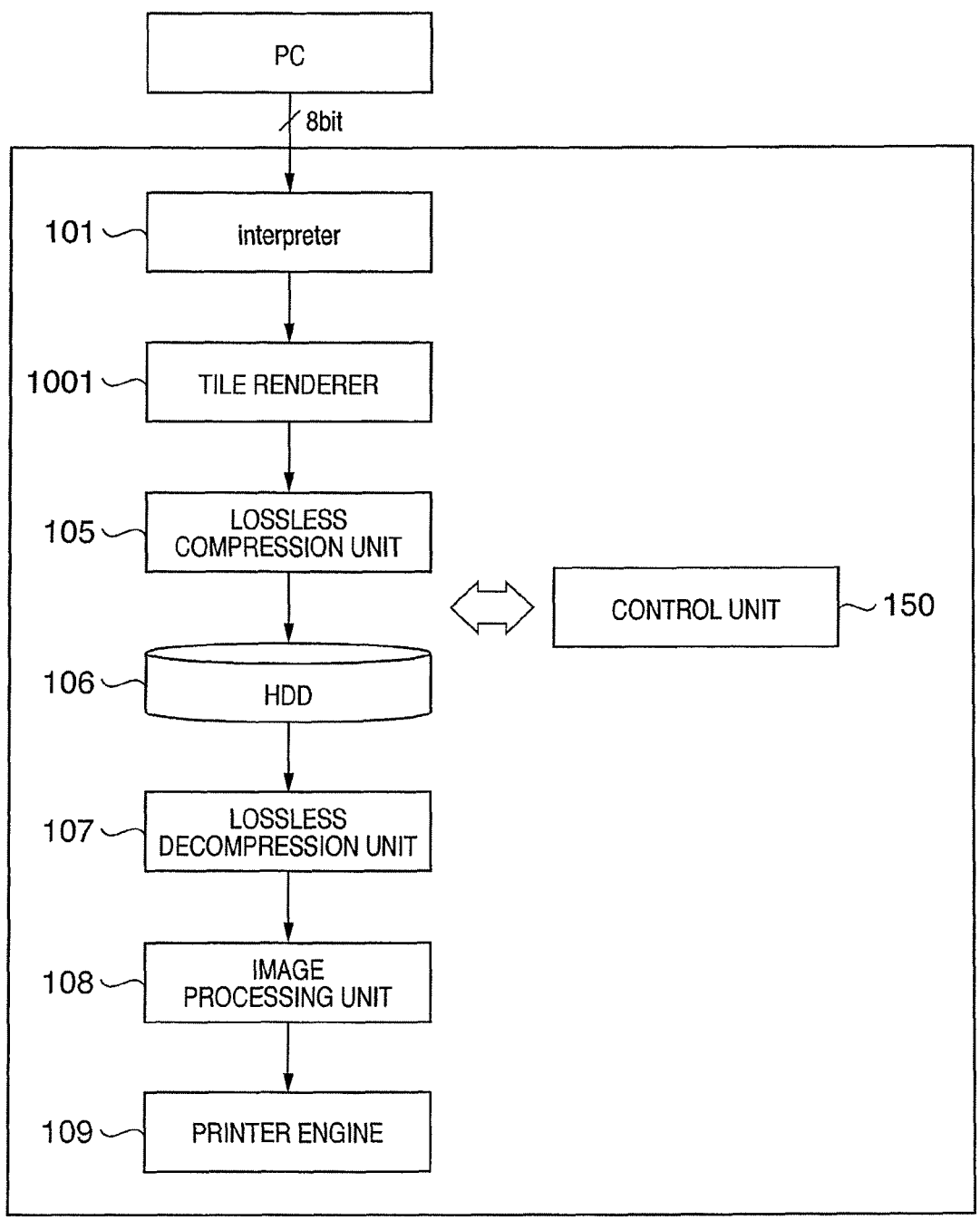
FIG. 10 is a block diagram of an image processing apparatus in the seventh embodiment.

FIG. 10 is a block diagram of an image processing apparatus in the seventh embodiment. In FIG. 10, a renderer 1001 replaces the tile renderer 201 in the block diagram of FIG. 3.

A page input to an interpreter 101 is converted into DL data, which is transmitted to the renderer 1001. The renderer 1001 resizes the DL data, and determines the type of tile (character/line image or another) from the bit depth. Then, the renderer 1001 uses the determination result of each tile for the following majority determination.

If the number of tiles of the character/line image type is larger than that of tiles of another type in one page to be processed, the entire page is rendered at 8 bits.

If the number of tiles of the character/line image type is smaller than that of tiles of another type, the entire page is rendered at 10 bits. The renderer 1001 transmits the rendered bitmap data and page type information (1 byte) to a lossless compression unit 105.

This increases the subsequent process speed because even a page slightly containing an image other than a character/line image is rendered at 8 bits per pixel.

The unit in the above description is easily changed. That is, the above description is similarly applicable when determining the type of image for each pixel and switching the rendering precision for each tile. The above description is also applicable when determining the type of image for each pixel and switching the rendering precision for each page.

In the above description, the determination criterion to switch the rendering precision is also easily changed. The rendering precision may be based on determination different from the above-mentioned majority determination.

For example, if even one tile of the character/line image type exists among tiles at part of one page to be processed (at the center of the page), the entire page may be rendered at 8 bits. In this case, if no tile of the character/line image type exists in part (center) of one page, the entire page is rendered at 10 bits.

Eighth Embodiment

The seventh embodiment executes majority determination of the type, and when the number of tiles of the character/line image type in a page is larger than that of tiles of another type, renders the entire page at 8 bits.

It is known that 8-bit rendering of a gradation area degrades the image quality. The eighth embodiment will describe a method of increasing the process speed while avoiding degradation of the gradation image quality and switching the rendering precision.

Figure 11:
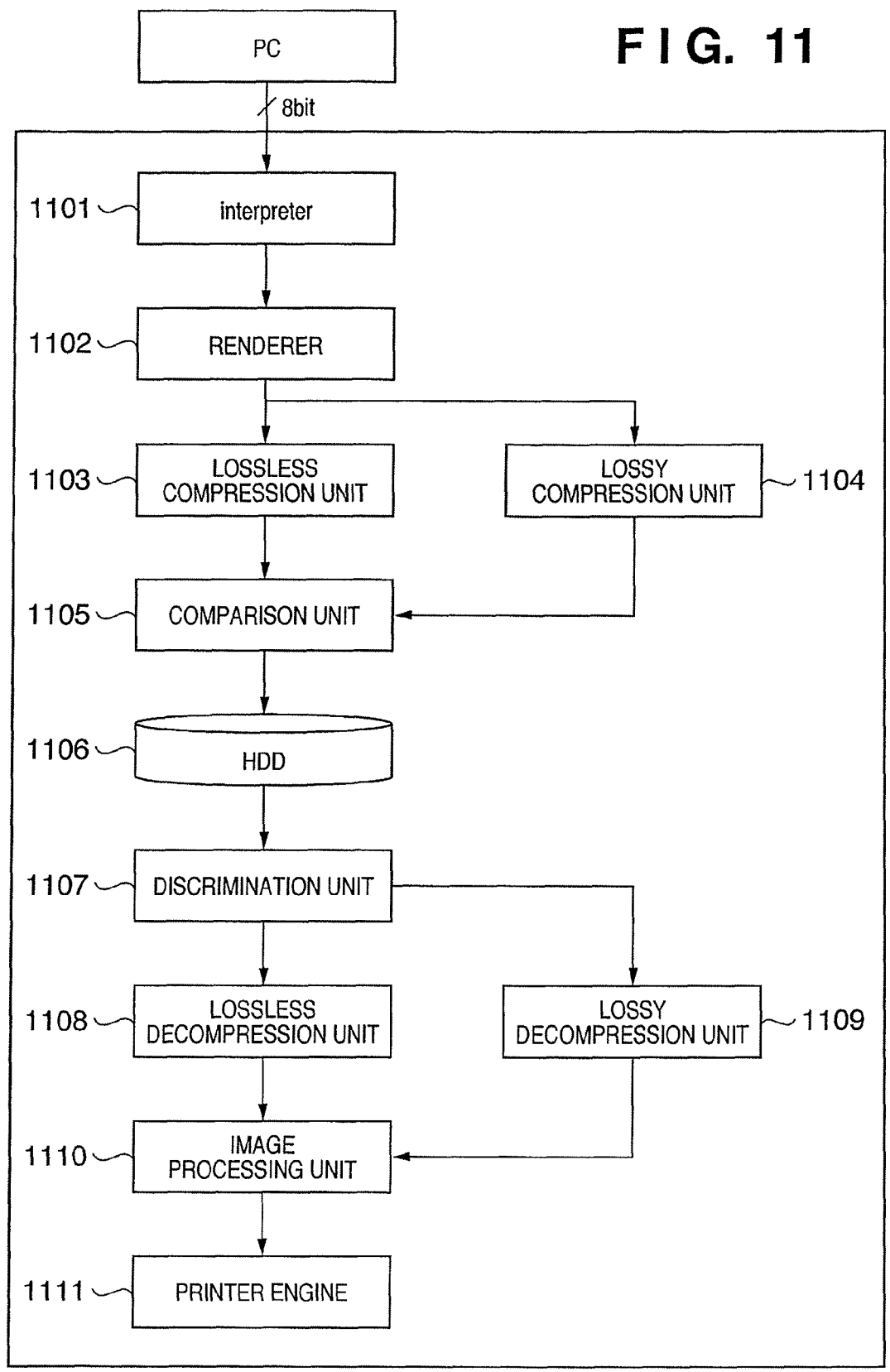
FIG. 11 is a block diagram of an image processing apparatus in the eighth embodiment.

FIG. 11 is a block diagram of an image processing apparatus in the eighth embodiment. In FIG. 11, reference numeral 1101 denotes an interpreter; 1102, a renderer; 1103, a lossless compression unit; 1104, a lossy compression unit; 1105, a comparison unit; 1106, an HDD; 1107, a discrimination unit; 1108, a lossless decompression unit; 1109, a lossy decompression unit; 1110, an image processing unit; and 1111, a printer engine.

PDL data input from a PC into the interpreter 1101 has the same structure as that of PDL data in the first embodiment, and further contains attribute information of each pixel representing one of a character/line image, gradation image, or photograph image. After accepting a PDL input, the interpreter 1101 determines the rendering precision of a tile serving as the unit of a subsequent process based on the attribute information.

Figure 12:
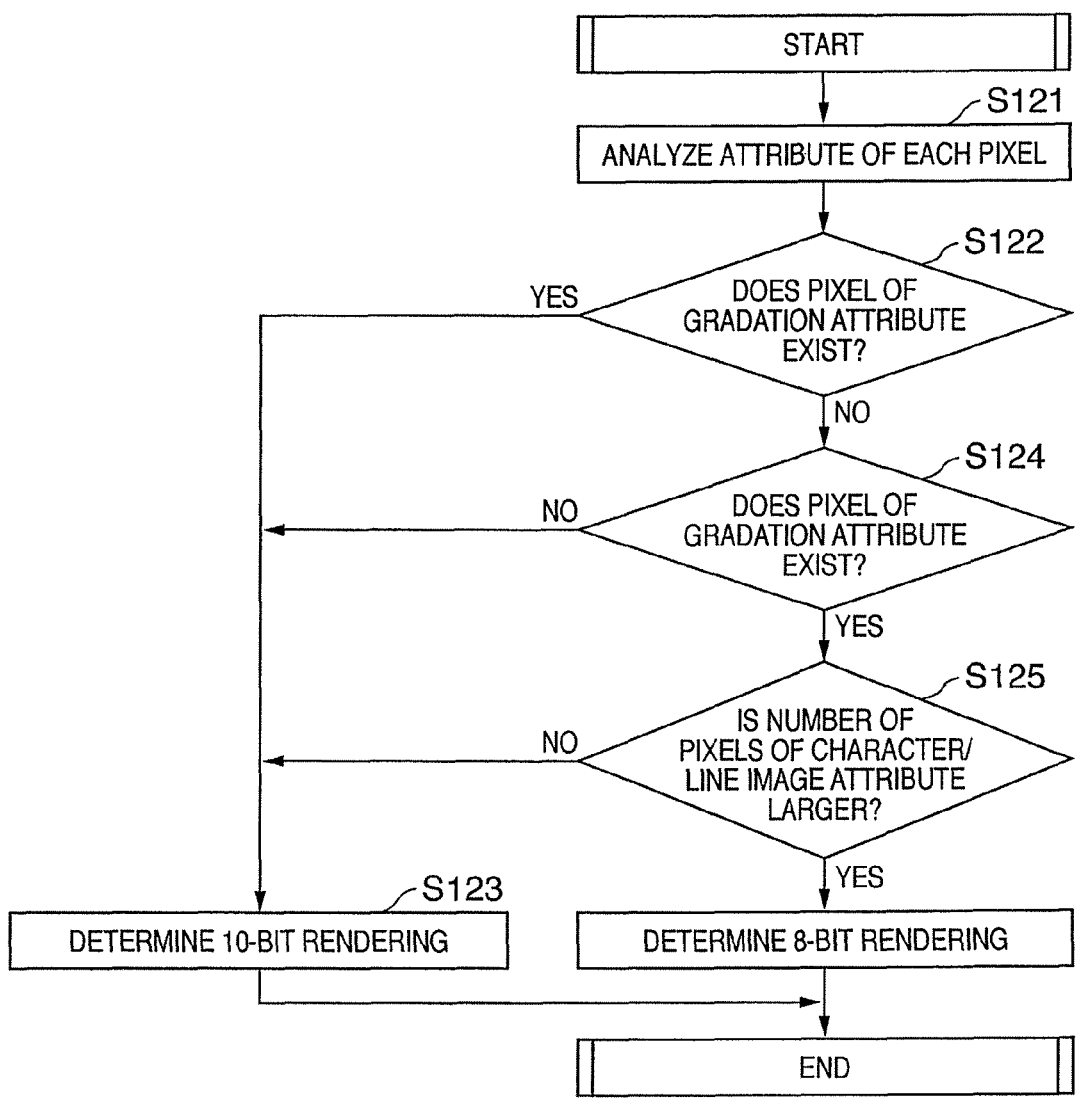
FIG. 12 is a flowchart showing process procedures to determine a rendering method in the eighth embodiment.

As the rendering precision determination method in the eighth embodiment, the interpreter 1101 checks attribute information of each pixel in the tile of interest, as shown in FIG. 12 (step S121).

If a pixel having the gradation attribute exists (YES in step S122), the interpreter 1101 determines to render the data at 10 bits (step S123). If no pixel of the gradation attribute exists (NO in step S122), the process advances to step S124. In step S124, the interpreter 1101 checks whether a pixel of the character/line image attribute exists. If no pixel of the character/line image attribute exists (NO in step S124), the interpreter 1101 determines that the pixel has the photograph attribute, and determines to render the data at 10 bits (step S123).

If a pixel of the character/line image attribute exists (YES in step S124), the interpreter 1101 compares the number of pixels of the character/line image attribute to that of pixels of the photograph attribute (step S125).

If the interpreter 1101 determines that the number of pixels of the character/line image attribute is equal to or smaller than that of pixels of the photograph attribute (NO in step S125), it determines to render the data at 10 bits (step S123). If the number of pixels of the character/line image attribute is larger than that of pixels of the photograph attribute (YES in step S125), it determines to render the data at 8 bits (step S126).

Tiles rendered at 8/10 bits as a result of the above process are as follows.

[8-Bit Rendering]
tile formed from only pixels of the character attribute
tile formed from pixels of the character/line image attribute and pixels of the photograph attribute

[10-Bit Rendering]
tile formed from only pixels of the gradation attribute
tile formed from only pixels of the photograph attribute
tile formed from pixels of the character/line image attribute and pixels of the photograph attribute
tile formed from pixels of the gradation attribute and pixels of the character/line image attribute
tile formed from pixels of the gradation attribute and pixels of the photograph attribute
tile formed from pixels of the gradation attribute, pixels of the character/line image attribute, and pixels of the photograph attribute After determining the rendering precision, the interpreter 1101 transmits the rendering precision information and pixel data of the tile to the renderer 1102. The renderer 1102 resizes the input tile based on the rendering precision information, and renders the tile at 8 or 10 bits. At this time, a predetermined bit string ("01" in the eighth embodiment) is added as bit precision information after the LSB for an 8-bit pixel, as described in the first embodiment.

After rendering each tile, the renderer 1102 transmits the rendering result of each tile to the lossless compression unit 1103 and lossy compression unit 1104. The lossless compression unit 1103 and lossy compression unit 1104 analyze bit information, compress data, and transmit the compressed data to the comparison unit 1105. The comparison unit 1105 transmits compressed data of the smaller code amount to the HDD 1106, which stores it. At this time, the comparison unit 1105 adds, to compressed data of each tile, side information representing which of the encoding schemes is applied.

The discrimination unit 1107 reads out compressed data of each tile from the HDD 1106 in synchronism with the print timing of the printer engine 1111. The discrimination unit 1107 analyzes the side information, and transmits the compressed data of the tile to the lossless decompression unit 1108 or the lossy decompression unit 1109. The lossless decompression unit 1108 or the lossy decompression unit 1109 decompresses the received data, and transmits the decompressed image to the image processing unit 1110. The image processing unit 1110 performs a predetermined image process (including RGB→YMC conversion and a UCR process), transmits the resultant image to the printer engine 1111, and prompts it to print.

The eighth embodiment determines the attribute of each pixel, and sets the 10-bit rendering precision for a tile containing pixels of the gradation attribute. However, the present invention also includes a method for determining the attribute of each pixel, and setting the 10-bit rendering precision for a page containing pixels of the gradation attribute. The present invention also includes a method for rendering a page at 10 bits when the attribute of each tile is determined and a page contains tiles of the gradation attribute.

As described above, it is determined to render, at 10 bits, a tile containing a gradation image whose quality seriously degrades by 8-bit rendering. Then, a tile containing a character/line image is rendered at 8 bits as much as possible. This can allow for high speed while suppressing degradation of the image quality.

Ninth Embodiment

The ninth embodiment will describe a method for selecting the rendering precision from a different standpoint from the first embodiment.

The rendering precision change method will be explained in detail. In the ninth embodiment, either lossless encoding or lossy encoding is selected and used. The ninth embodiment will describe an example using JPEG-LS as lossless encoding and JPEG as lossy encoding.

Encoding of images having different attributes by JPEG-LS will be examined. In this case, there are three image attributes: (1) photograph, (2) gradation (computer graphics), and (3) character/line image.

(1) Photograph

[Subjective Image Quality] Compared to an 8-bit-rendered image, a 10-bit-rendered image is slightly higher in quality in an area where the tone gradually changes, like a blue sky or sea, but is almost equal in other area.

[Code Amount] A 10-bit image has a prediction error four times larger than that of an 8-bit image at the maximum, has a broad frequency distribution, and has increased code amount after compression.

[Bit Precision Selection] Switching from 8-bit rendering to 10-bit rendering does not show an increase in image quality corresponding to an increase in code amount. Hence, an image having the photograph attribute is rendered at the 8-bit precision, and the rendering result is encoded according to JPEG-LS.

(2) Gradation

[Subjective Image Quality] A 10-bit-rendered image is much higher in quality than an 8-bit-rendered image.

Figure 14:
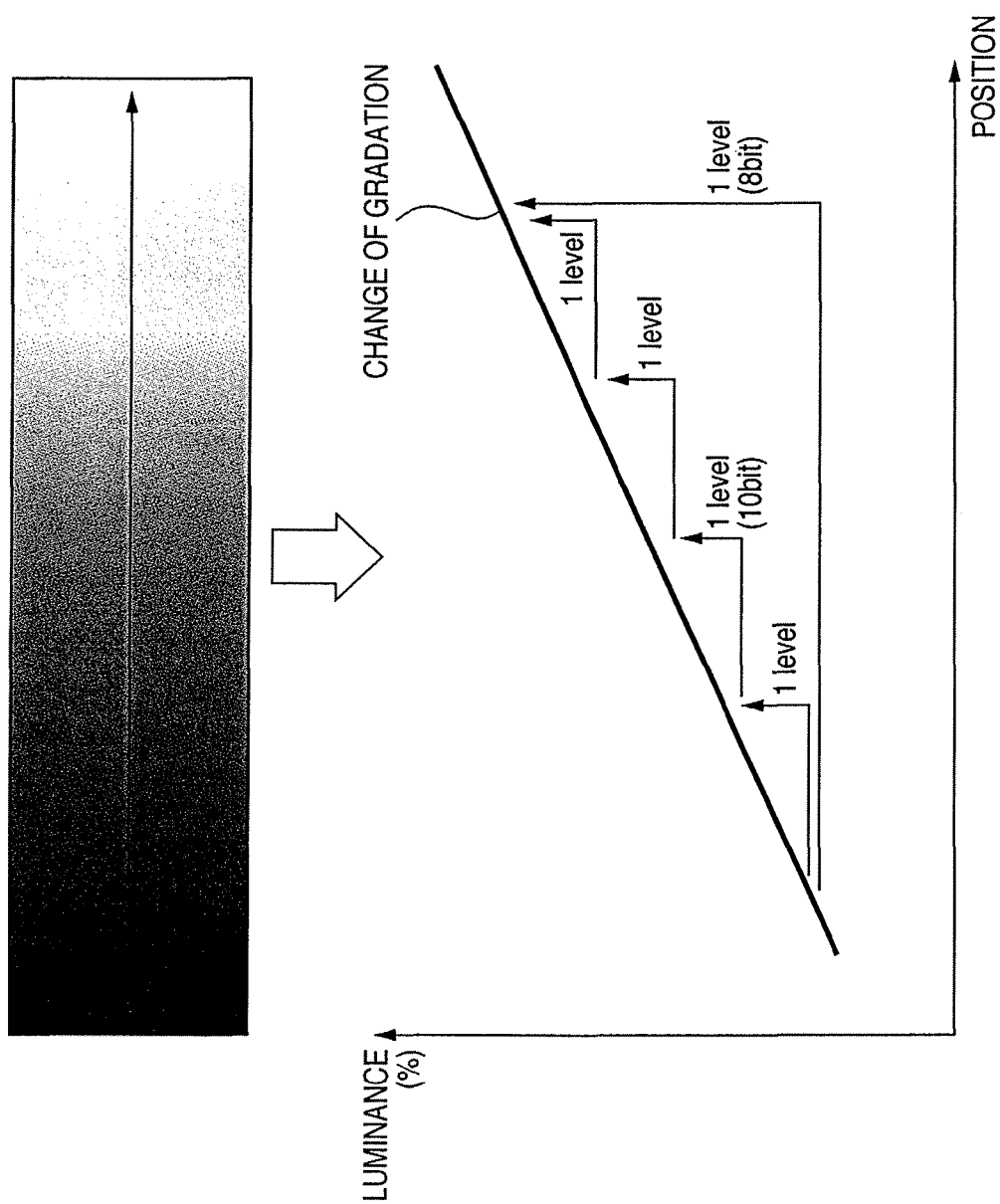
FIG. 14 is a view for explaining gradation expressions in 8-bit rendering and 10-bit rendering.

[Code Amount] Both a 10-bit image and 8-bit image have a prediction error of one level, as shown in FIG. 14, and the code amounts generated by encoding in the regular mode are equal. Since the run in lateral gradation is longer in an 8-bit image than in a 10-bit image, the code amount of the 8-bit image is smaller in the run mode. Thus, the total code amount of the 10-bit image is larger than that of the 8-bit image.

[Bit Precision Selection] As described above, the code amount of a 10-bit image is more likely to increase in comparison with that of an 8-bit image. However, switching from 8-bit rendering to 10-bit rendering shows an increase in image quality corresponding to an increase in code amount. For this reason, an image having the gradation attribute is rendered at the 10-bit precision, and the rendering result is encoded according to JPEG-LS.

(3) Character/Line Image

[Subjective Image Quality] The quality of an 8-bit-rendered image is equal to that of a 10-bit-rendered image.

[Code Amount] A 10-bit image has a prediction error at the edge four times larger than that of an 8-bit image at the maximum, has a broad frequency distribution, and has increased code amount after compression.

[Bit Precision Selection] Switching from 8-bit rendering to 10-bit rendering does not show an increase in image quality corresponding to an increase in code amount. Thus, an image having the character/line image attribute is rendered at the 8-bit precision, and the rendering result is encoded according to JPEG-LS.

As a summary of the above examination, FIG. 15 shows the rendering bit precisions of the respective image attributes in the use of lossless encoding JPEG-LS as the encoding scheme.

Lossy encoding JPEG as the encoding scheme will be examined for the three image attributes: (1) photograph, (2) gradation (computer graphics), and (3) character/line image.

(1) Photograph

Figure 16:
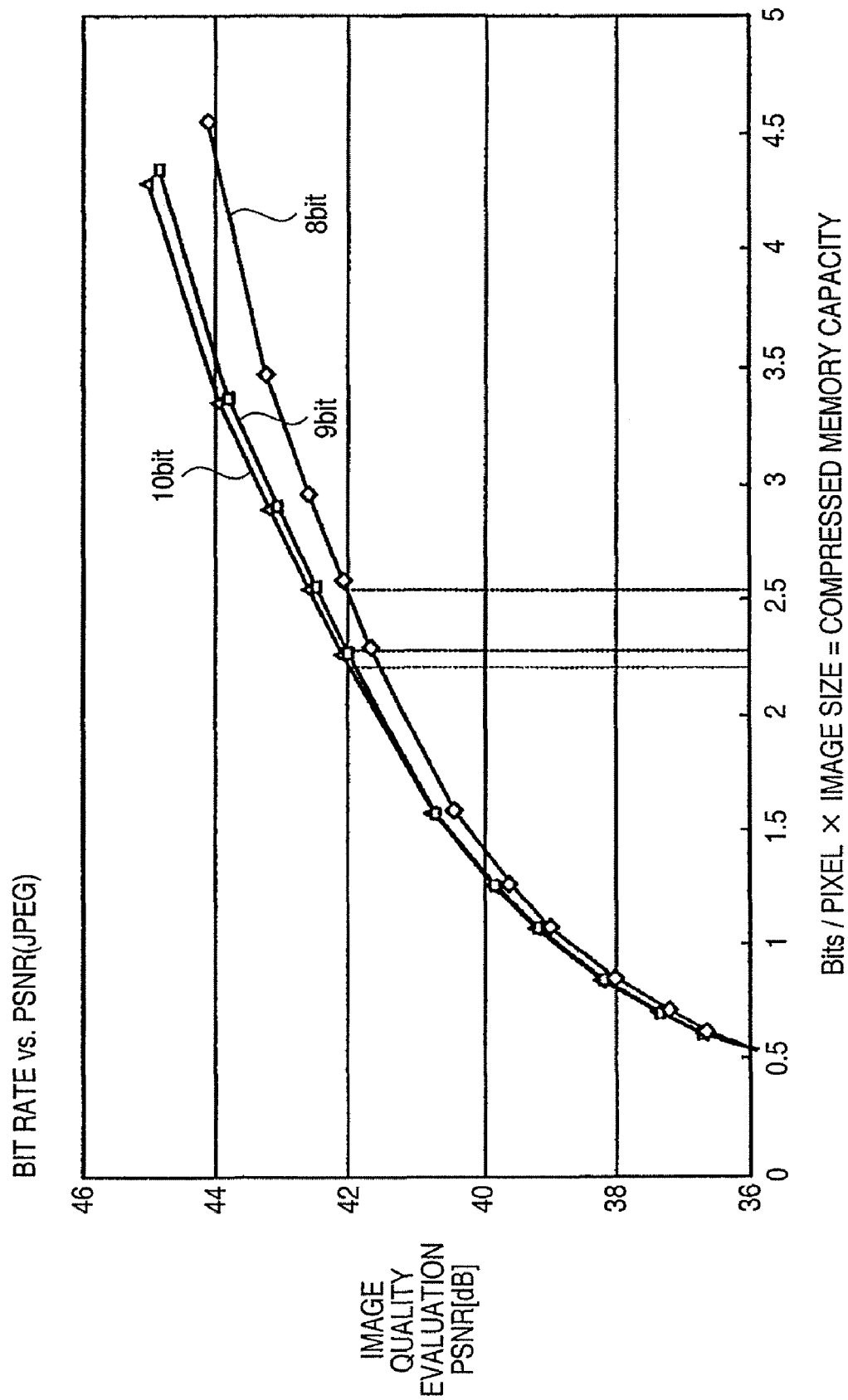
FIG. 16 is a graph showing the relation between the code amount and the image quality in JPEG.

[Objective Image Quality and Code Amount] The code amount and image quality have a relation as shown in FIG. 16. Ten-bit rendering exhibits a smaller code amount than that of 8-bit rendering at the same image quality, and exhibits a higher image quality at the same code amount.

[Bit Precision Selection] Improvement of the image quality and reduction of the code amount can be achieved not by JPEG-encoding an 8-bit rendering result but by JPEG-encoding a 10-bit rendering result. From this, when JPEG-encoding an image having the photograph attribute, the image is rendered at the 10-bit precision, and the rendering result is JPEG-encoded.

(2) Gradation

[Objective Image Quality and Code Amount] Similar to a photograph, the code amount and image quality have a relation as shown in FIG. 16. Ten-bit rendering exhibits a smaller code amount than that of 8-bit rendering at the same image quality, and exhibits a higher image quality for the same amount of code.

[Bit Precision Selection] Improvement of the image quality and reduction of the code amount can be achieved not by JPEG-encoding an 8-bit rendering result but by JPEG-encoding a 10-bit rendering result. From this, when JPEG-encoding an image having the gradation attribute, the image is rendered at the 10-bit precision, and the rendering result is JPEG-encoded.

(3) Character/Line Image

[Subjective Image Quality] The quality of an 8-bit-rendered image is equal to that of a 10-bit-rendered image.

[Code Amount] Compared to an 8-bit image, a predetermined AC coefficient of a 10-bit image increases in a block containing the edge, and the code amount increases slightly.

[Bit Precision Selection] JPEG-encoding the rendering result at the 10-bit precision increases the code amount in comparison with JPEG-encoding an 8-bit rendering result, and does not show an increase in image quality corresponding to an increase in the code amount. When JPEG-encoding an image having the character/line image attribute, the image is rendered at the 8-bit precision, and the rendering result is JPEG-encoded.

As a summary of the above examination, FIG. 17 shows the rendering bit precisions of the respective image attributes in the use of lossy encoding JPEG as the encoding scheme.

Figure 18:
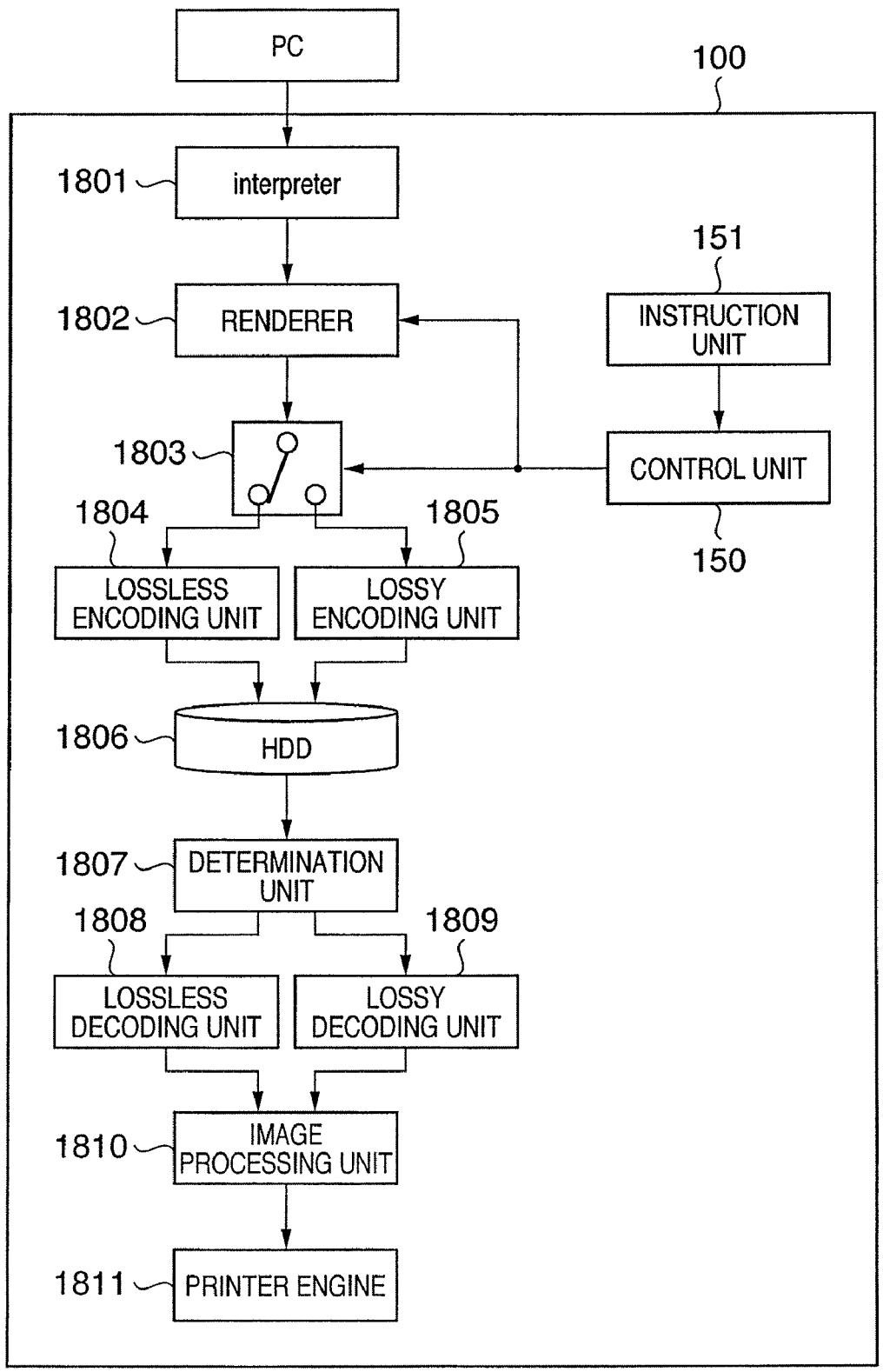
FIG. 18 is a block diagram of an image processing apparatus in the ninth embodiment.

FIG. 18 is a block diagram showing the main part of an image processing apparatus (a copying machine, or a so-called multifunctional peripheral having scanner, printer, and communication functions) in the ninth embodiment. In FIG. 18, reference numeral 1801 denotes an interpreter; and 1802, a renderer. The renderer 1802 renders an image at the number of bits (8 bits or 10 bits) designated by a control unit 150.

Reference numeral 1803 denotes a switch which outputs an image rendered by the renderer 1802 to either a lossless encoding unit 1804 or lossy encoding unit 1805 in accordance with an instruction from the control unit 150. The lossless encoding unit 1804 employs JPEG-LS, and the lossy encoding unit 1805 employs JPEG. Reference numeral 1806 denotes an HDD (Hard Disk Drive) as a storage means for accumulating compression-encoded image data. Reference numeral 1807 denotes a determination unit which reads out encoded data from the HDD 1806, determines the type of encoded data, i.e., whether the data is encoded as lossless or lossy, and outputs the readout encoded data to either a lossless decoding unit 1808 or lossy decoding unit 1809 based on the determination result.

Reference numeral 1810 denotes an image processing unit which converts image data decoded by the lossless decoding unit 1808 or lossy decoding unit 1809 into data of the printing color space (generally, C, M, Y, and K), and corrects the image data in accordance with printer engine properties. Reference numeral 1811 denotes a printer engine; and 151, an instruction unit such as an operation panel.

In this arrangement, when an operator operates the instruction unit 151 to set lossless encoding, the control unit 150 controls the switch 1803 to connect the renderer 1802 to the lossless encoding unit 1804. At this time, the control unit 150 sets the renderer 1802 so as to render an image of the photograph attribute at the 8-bit precision, an image of the gradation attribute at the 10-bit precision, and an image of the character/line image attribute at the 8-bit precision in accordance with the table shown in FIG. 15.

When the operator operates the instruction unit 151 to set lossy encoding, the control unit 150 controls the switch 1803 to connect the renderer 1802 to the lossy encoding unit 1805. At this time, the control unit 150 sets the renderer 1802 so as to render an image of the photograph attribute at the 10-bit precision, an image of the gradation attribute at the 10-bit precision, and an image of the character/line image attribute at the 8-bit precision in accordance with the table shown in FIG. 17.

In either case, the control unit 150 ignores an encoding scheme selection request from the instruction unit 151 until the end of rendering at least one page after the start of rendering. According to the ninth embodiment, a user operates the instruction unit 151 in advance to select an encoding scheme. The selected encoding scheme is maintained unless a change instruction is issued. The switch 1803 also maintains the selection. For this purpose, a nonvolatile storage device such as an HDD stores the selected encoding scheme.

Figure 19:
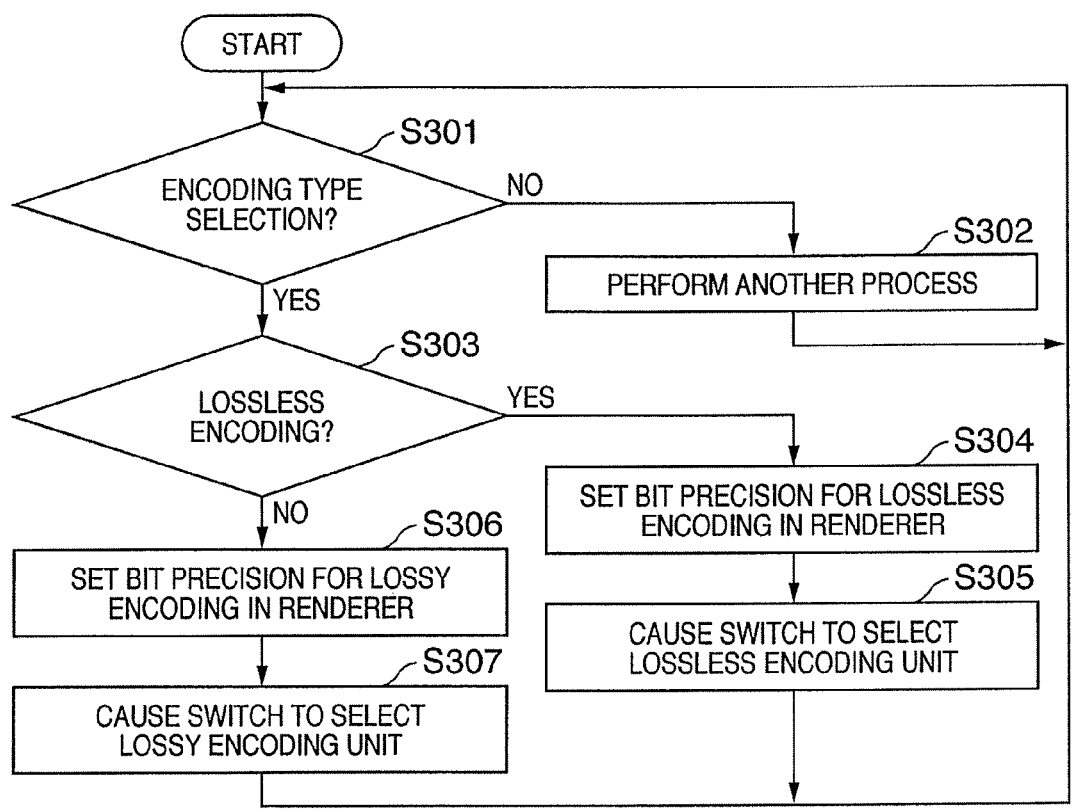
FIG. 19 is a flowchart showing process procedures in the ninth embodiment.

FIG. 19 shows the process procedures of the control unit 150 when accepting an instruction from the instruction unit 151.

In step S301, the control unit 150 determines whether the instruction input from the instruction unit 151 is an encoding scheme selection instruction. If the result is NO in step S301, i.e., if the instruction is one other than the encoding scheme selection instruction, the process advances to step S302 to perform a corresponding process.

If the control unit 150 determines that the instruction is an encoding scheme selection instruction, it determines in step S303 whether lossless encoding has been selected. If lossless encoding has been selected, the process advances to step S304 to set the renderer 1802 so as to draw an image of each attribute at a bit precision indicated by the table shown in FIG. 15. The process advances to step S305 to cause the switch 1803 to select the lossless encoding unit 1804.

If the control unit 150 determines that the selected encoding scheme is lossy encoding, the determination result in step S303 is NO, and the process advances to step S306. In step S306, the control unit 150 sets the renderer 1802 so as to draw an image of each attribute at a bit precision indicated by the table shown in FIG. 17. The process advances to step S307 to cause the switch 1803 to select the lossy encoding unit 1805.

As described above, the ninth embodiment performs rendering at the number of bits suitable for the attribute of each image area of an image in accordance with whether lossless encoding or lossy encoding is used.

According to the ninth embodiment, one renderer executes rendering at precisions of 8 bits and 10 bits. However, it is also possible to independently arrange an 8-bit renderer and 10-bit renderer, and distribute DL data to be rendered in accordance with a determined bit precision.

The ninth embodiment adopts JPEG-LS as lossless compression, but another algorithm is also applicable. Similarly, an algorithm other than JPEG is also applicable to lossy compression.

Information representing the rendering precision is inserted in an 8-bit image in the down direction of the bit depth. However, the information is not limited to "01" as far as a fixed value is inserted.

Instead of inserting bits downward in an 8-bit image, accessory information such as a flag may simply be added to image data.

The ninth embodiment has exemplified 8 bits and 10 bits as rendering types, but the present invention is not limited to these bit counts. For example, as for a character/line image, a user may properly select the number of bits to be rendered. This selection may be set at the operation panel of the image processing apparatus. For example, the number of bits for a character/line image is set to 4 bits (because of R, G, and B, a total of 12 bits (even which can express 4,096 colors)). A color designated by DL data is converted into a similar color, and then resizing and rendering are performed, increasing the process speed.

The present invention is also applicable to more than 8 bits, e.g., 9 bits, 11 bits, or 16 bits. Externally input data is not limited to 8 bits. For example, 10-bit data can also be input.

The present invention has described an image processing apparatus having a lossless encoding unit and lossy encoding unit, but may also be applied to an image processing apparatus having only a lossless encoding unit or an image processing apparatus having only a lossy encoding unit. For example, an image processing apparatus adopting JPEG-LS for an image compression unit renders images of the photograph attribute, gradation attribute, and character/line image attribute at 8 bits, 10 bits, and 8 bits, respectively. An image processing apparatus adopting lossy encoding JPEG for an image compression unit renders images of the photograph attribute, gradation attribute, and character/line image attribute at 10 bits, 10 bits, and 8 bits, respectively.

The final output destination of image data is the printer engine in the above embodiments, but the display device can also be used as the final output destination to obtain the same operation effects. Hence, the present invention is applicable to an arbitrary image data output device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-353985, filed Dec. 7, 2005, and Japanese Patent Application No. 2006-269020, filed Sep. 29, 2006, which are hereby incorporated by reference herein in their entirety.

What is claimed is:

1. An image processing method comprising:
a selection step of selecting one of a plurality of compression algorithms;
an input step of inputting a code representing an object;
a discrimination step of discriminating the type of object represented by the code;
a decision step of deciding, in accordance with the object type and the selected compression algorithm, the number of bits per pixel of image data to be converted from the code;
a conversion step of converting the code into image data of the decided number of bits; and
an encoding step of encoding the converted image data based on the selected compression algorithm;
wherein the above steps are performed by a processor.

2. The method according to claim 1, wherein
the image data includes a plurality of components, and
in the decision step, which of the n bits and m bits (m<n) are used to express each component of one pixel is decided in accordance with the object type and the selected compression algorithm.

3. The method according to claim 1, wherein the object type includes one of a character/line image, a gradation image, and a natural picture.

4. The method according to claim 2, wherein the plurality of compression algorithms include a first compression algorithm using predictive encoding, and a second compression algorithm different from the first compression algorithm.

5. The method according to claim 4, wherein the first compression algorithm includes JPEG-LS, and the second compression algorithm includes JPEG.

6. The method according to claim 2, wherein in the decision step, when the object type is a character, conversion of the code representing the object into image data having each component expressed by m bits is decided regardless of the selected compression algorithm.

7. The method according to claim 2, wherein in the decision step, when the object type is a gradation image, conversion of the code representing the object into image data having each component expressed by n bits is decided regardless of the selected compression algorithm.

8. The method according to claim 2, wherein in the decision step, when the object type is a natural picture and the first compression algorithm is selected, conversion of the code representing the object into image data having each component expressed by m bits is decided, and when the object type is a natural picture and the second compression algorithm is selected, conversion of the code representing the object into image data having each component expressed by n bits is decided.

9. The method according to claim 4, wherein in the decision step, when the object type is a character, conversion of the code representing the object into image data having each component expressed by m bits is decided regardless of the selected compression algorithm,
when the object type is a gradation image, conversion of the code representing the object into image data having each component expressed by n bits is decided regardless of the selected compression algorithm,
when the object type is a natural picture and the first compression algorithm is selected, conversion of the code representing the object into image data having each component expressed by m bits is decided, and
when the object type is a natural picture and the second compression algorithm is selected, conversion of the code representing the object into image data having each component expressed by n bits is decided.

10. The method according to claim 9, wherein m is "8" and n is "10".

11. The method according to claim 1, further comprising steps of:
decoding image data encoded in the encoding step; and
outputting the decoded image data.

12. The method according to claim 11, wherein the output step includes print output or display output.

13. A computer-readable storage medium storing a computer program, which when executed by a computer, causes the to perform function:
a selection step of selecting one of a plurality of compression algorithms;
an input step of inputting a code representing an object;
a discrimination step of discriminating the type of object represented by the code;
a decision step of deciding, in accordance with the object type and the selected compression algorithm, the number of bits per pixel of image data to be converted from the code;
a conversion step of converting the code into image data of the decided number of bits; and
an encoding step of encoding the converted image data on the basis of the selected compression algorithm.

14. An image processing apparatus comprising:
selection means for selecting one of a plurality of compression algorithms;
input means for inputting a code representing an object;
discrimination means for discriminating the type of object represented by the code;
decision means for deciding, in accordance with the object type and the selected compression algorithm, the number of bits per pixel of image data to be converted from the code;
conversion means for converting the code into image data of the decided number of bits; and
encoding means for encoding the converted image data on the basis of the selected compression algorithm.

* * * * *